Aug. 18, 1931.        A. FRIDOLPH         1,819,412
FASTENING MEANS
Filed Dec. 1, 1926
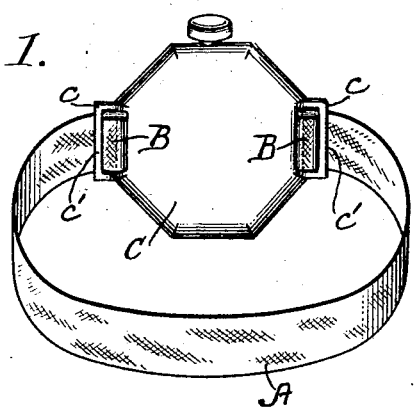
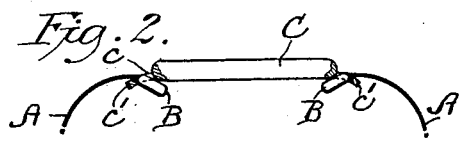
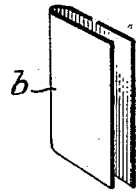
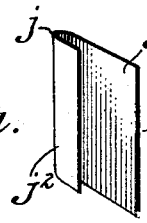
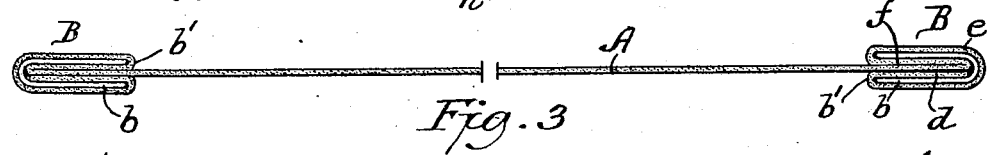
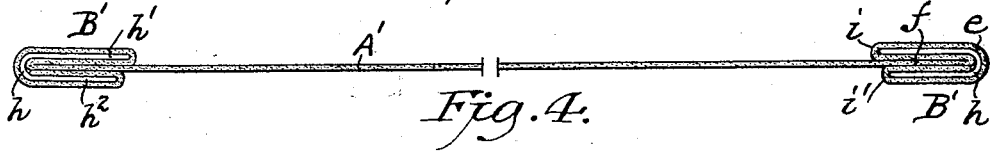
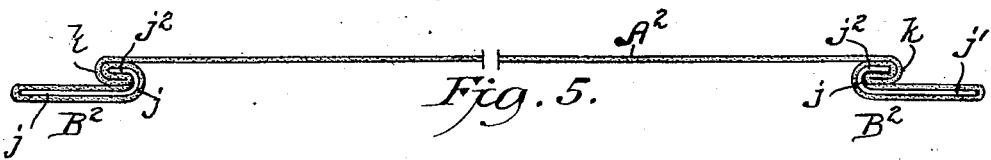
Inventors
Annette Fridolph
By their Attorney Patented Aug. 18, 1931

1,819,412

UNITED STATES PATENT OFFICE

ANNETTE FRIDOLPH, OF NEW YORK, N. Y., ASSIGNOR TO A. B. A. SPECIALTIES COMPANY, INC., OF NEW YORK, N. Y., A CORPORATION OF NEW YORK

FASTENING MEANS

Application filed December 1, 1926. Serial No. 151,856.

This invention is a fastening means whereby a ribbon, band, or analogous flexible member is retained in a relatively flat condition and at the same time is rendered available as a means for securely holding an object, such as a wrist watch, or other article, in place upon the wrist of a wearer.

One of the uses for which the invention is suitable is that of holding or securing a relatively small object, such as a watch, or the like, on the wrist of a wearer, which general utility is now popular with the public; but, manifestly, the invention is not restricted to this particular utility, and may be availed of in other relations, such as for a hose supporter, or for a waist belt, and for various other purposes.

The object is to afford an effective fastening means for a band or ribbon engageable easily and quickly with an object in a way to preclude accidental separation of band from object, or vice versa, and at the same time permit the band or ribbon to remain in a flat condition, substantially free from a tendency to twist or fold, whereby bands or ribbons of desirable colors and styles may be interchanged readily with objects, such as wrist watches, and such bands or ribbons may be replaced at relatively small cost when worn or frayed.

To these ends, the invention embodies a flexible band one end (or both ends) of which is/are reinforced by a non-flexible member constituting with the band a tab the dimensions of which, relatively to a loop or eye provided as a part of the object to be held, are such that a freely attachable and detachable secure fastening is afforded, whereby the band and the object are coupled in a way for the band to remain normally in a flat or non-folded condition.

As indicated, the object is provided with a loop or eye, normally oblong in form, and of given dimensions with reference to its length and width.

The tab of the band (at one or each end thereof) is of such dimensions that said tab by turning or moving it to a determined position may be thrust easily and quickly through the loop either to attach or detach the band, but when it is desired to attach the band and the object, said tab is turned for its width to extend crosswise of the loop or eye, the effect of which is to couple the band and the object by precluding the accidental separation of tab from loop, or vice versa, in the normal service of the band and object. It may be stated that the security of the coupling is enhanced by the provision of a shoulder at the line of demarcation between tab and band, with which shoulder is adapted to contact a part of the loop, with the result that a certain leverage is established between tab and loop which in conjunction with the excess in the width of the tab relatively to the width of the loop precludes the accidental separation of the parts. Such differentiation in the width of the tab to the loop may be further increased, and to a marked extent, by the formation given to the tab arising from the use of a channeled member having two wings, one of which exceeds in width the other wing, and by combining a double winged member of such formation with the flexible band there results a tab of a pronounced character affording a distinctive external shoulder with which the loop is adapted for engagement in such a way as to more effectively couple the band and object to the extent that accidental separation in normal condition of service is almost wholly prevented while at the same time the band remains in the required flat condition.

Other functions and advantages of the invention will appear from the following description taken in connection with the drawings, wherein—

Figure 1 is a perspective view of the invention as used in connection with a wrist watch, or analogous object.

Figure 2 is a sectional elevation illustrating more particularly the mode of engaging the tabs of the band with the loops of the object.

Figure 3 is a sectional view of the band with stiffened tabs at the respective ends thereof, and Figure 3ª is a detail view of one of the channeled members adapted to be encased within a part of the band and to produce therewith a stiffened tab at said end (or ends) of the band.

Figure 4 is a sectional view of a band with other forms of tabs at the respective ends, and Figure 4ª is a perspective view of the chaneled member to produce with the band a tab of the form shown in Figure 4.

Figure 5 is a sectional view of a band with another form of tab at each end, and Figure 5ª is a perspective view of the chaneled member to be used for producing the tab of the form shown in Figure 5.

Referring now to Figures 1, 2, 3 and 3ª, A is the band provided at each end with a tab B, and C is the object or article constituting a part or member to be held or confined on the person of a wearer, such as a wrist watch or analogous article, the same being provided with a loop or eye, c, one or more. Obviously, the article or object may be of a desired construction, ornamental or otherwise, and the nature or character of such article may differ widely according to the use thereof, but in the present invention, such article is provided with a loop or loops, c, of a desired form and size in order that the flexible member may be coupled to and uncoupled from said article or object. Usually, the loop c is oblong in form with a bar, c', and the opening in said loop c is definite as to length and width, although it should be understood that the invention is not limited or restricted as to a loop of any particular shape and dimensions.

The tab, B, comprises in part the band, A, and in part a channeled stiffening member, b, the latter being composed usually of metal, or analogous material. Said channeled member and a definite part of the band are associated or combined in such a way that the channeled part (either partly or wholly) is encased by and within a folded part of the band, whereby said channeled member and the band are attached permanently and the channeled part affords the desired rigidity and stability to the band at the end or ends thereof. Said band may be composed of any material suitable for the purpose, and in practice it is usual to employ a piece of fabric, either cotton, silk, or a combination of silk and cotton. Accordingly, the band comprises a piece of fibrous material, of a desired length and width suited for the purposes, but, manifestly, the particular material employed may be changed or modified to meet the requirements.

The band and the channeled member b are associated one with the other by folding a part of said band upon itself and around the channeled member, as depicted in Figure 3, and as disclosed in a copending application filed by Annette Fridolph, on October 11, 1926, Serial No. 140,703. An end of the band is inserted into the channel of the part b, as at d in Figure 3, then the band and member b are wrapped to encase the member b within the folded part e, whereupon the band is doubled upon itself and thrust into the channel of the part b, as indicated at f, and thereupon the member b and folded parts d, e, f, of the band are subjected to pressure, as a result of which the metal part b is compacted and the folded fabric is gripped to produce a rigid tab, the channeled part of which is encased, partly or wholly, within the folded fabric.

The length of the tab B is equal substantially to the width of the band A, although the length of channeled member b may in some instances be less than the width of the band A, and in other instances the length of channeled part b may exceed the width of band, but speaking generally the channeled part is such that it is encased by the folded part of the band, in order that no metal may be exposed for contact with the flesh of the wearer. The width of the band and the length of the tab B are slightly less than the length of the opening in the loop c, but the width of the tab B exceeds the width of the opening in loop c, and again, the thickness of the tab (constituted by the part b and the folded fabric) is less than the width of the opening in loop c. By making the band and tab as recited, and giving to the tab B and the loop c the relative dimensions specified, the band is adapted to remain in a flat non-folded condition when the band and the object are connected, there being no occasion for folding or creasing the flexible band in assembling or detaching the parts A, C. The size of the rigid tab B relatively to the opening in the loop c requires, however, that the tab shall be turned to a position wherein said tab may be thrust through the loop, and this requirement for coupling and uncoupling the parts is complied with my making the tab of less thickness than the width of the opening in the loop c, whereby the tab may be passed easily through the loop, but thereafter the tab B is turned crosswise of the loop or at an angle to the plane of the loop as depicted in Figure 2, in a way for the width of the tab to extend across the width of the loop, with the result that the tab cannot be separated from the loop in the normal service of the device.

The assemblage of the channeled member b with the folded length of the flexible member A to produce the tab B produces a shoulder or shoulders, b', adjacent the surfaces of the flexible member, and in the service of the band for holding the part C, this shoulder b' is engaged frictionally with a cross bar c' of the loop c, see Figures 1 and 2, whereby the tab is precluded from movement relatively to the loop in a direction to withdraw the tab from the loop in the normal service of the parts A, C.

The form and dimensions of the channeled member may be modified as depicted in

Figures 4ᵃ and 5ᵃ to produce tabs of the character shown in Figures 4 and 5, respectively, on the respective ends of the flexible members A', A². In Figure 4ᵃ, the channeled member $h$ is constructed for one wing $h'$ to exceed in width the other wing $h^2$, and said member with wings of unequal width is associated in the manner described with the flexible member A' to produce a tab or tabs B' by folding the flexible member partly within the channeled member, and by wrapping or encasing the channeled member within the flexible member, and thereafter compacting the channeled member upon itself and upon the flexible member to result in a rigid tab, such as B'. The wings of unequal width of the channeled member produce in the resulting tab B' two shoulders $i$, $i'$, one of which, $i$, protrudes further than the other, $i'$, see Figure 4, and thus the cross member of the loop $c$ is adapted for engagement with the shoulder $i'$ in a way to minimize the accidental separation of the tab end of the flexible member from the loop of the article.

Again, the channeled member $j$ may be of the form shown in Figure 5ᵃ, wherein the wing $j'$ greatly exceeds the width of the wing $j^2$. Such channeled member $j$ is assembled with the flexible ribbon or band in the manner herein recited to produce a tab B² of the form shown in Figure 5, and the tab thus resulting has an abrupt shoulder, $k$, beyond which the wing $j'$ extends for an appreciable distance, whereby said wide wing $j'$ is adapted to effectively preclude accidental separation of the band from the wrist watch, or other article, for the reason that the tab B² exceeds to a marked extent the width of the slot in the loop and the cross bar of said loop is adapted for engagement with the shoulder $k$ so as to overcome a tendency of the tab to turn to a position in which said tab may slip through the opening of the loop $c$.

Having thus disclosed my invention, what I claim as new and desire to secure by Letters Patent is:

1. In a fastening of the class described, a flexible member and a channeled member encased within a folded part of the flexible member and compacted for effecting the rigid attachment of the two members, said channeled member comprising parts of unequal width.

2. In a fastening of the class described, a flexible member, and a channeled member comprising parts unequal in width, said flexible member being folded for encasing the channeled member and said flexible member having a folded portion within the channel of said member, whereby the two members are united by compacting the channeled member.

3. In a separable fastener, a part provided with a closed loop or eye, and a second part comprising a channeled metal member and a single strip of flexible material doubled upon itself within the channeled member, a portion of said flexible material being wrapped around said channeled member for producing a stiff tip on the flexible material, the length of the loop or eye being equal substantially to the length of said stiff tip, whereby the flexible material adjacent said tip is adapted to occupy the loop or eye in a flat condition substantially free from wrinkles.

4. In a separable fastener, a part provided with a closed loop or eye, a second part comprising a single strip of flexible material provided with a metal member encased by the flexible material, said flexible material being united with the metal member by having the flexible material doubled upon itself within the metal member, the length of said loop or eye being equal substantially to the length of the metal member and said metal member being insertible through the loop or eye for locking engagement therethrough and for the flexible material adjacent said metal member to occupy the loop or eye while remaining in a flat condition substantially free from wrinkles.

5. In a separable fastener, a part provided with a closed loop and a second part comprising a stiffening member, a single strip of flexible material folded upon itself within the stiffening member, said stiffening member also being encased by a portion of the flexible material and adapted to be thrust through said loop for the flexible material to occupy said loop in a substantially flat non-wrinkled condition, said stiffening member being provided on one side and intermediate its edges with a shoulder adapted for locking engagement with a wall of said loop.

6. In a separable fastener, a part provided with a closed loop or eye, and a second part comprising a channeled metal member having flat sides of unequal width and a flexible member encasing said channeled member and having a doubled portion within the channel to form a permanent united fastening when the flat sides of the channeled member are compressed to grip the doubled portion of the flexible material.

7. In a separable fastener, a part provided with a closed loop or eye, and a second part comprising a channeled metal member having flat sides of unequal width and a flexible member encasing said channeled member and having a doubled portion within the channel to form a permanent united fastening when the flat sides of the channeled member are compressed to grip the doubled portion of the flexible material, the lengths of the channeled member and the loop and the width of the flexible material being substantially the same.

In testimony whereof I have hereto signed my name this 30th day of November, 1926.

ANNETTE FRIDOLPH.